United States Patent [19]

Adell

[11] 4,387,125
[45] Jun. 7, 1983

[54] DOOR EDGE GUARD

[75] Inventor: Robert Adell, Novi, Mich.

[73] Assignee: U.S. Product Development Company, Novi, Mich.

[21] Appl. No.: 216,860

[22] Filed: Dec. 16, 1980

[51] Int. Cl.³ .................. B60R 13/02; B60R 13/04
[52] U.S. Cl. ........................................ 428/31; 428/122;
428/124; 428/126; 428/130; 428/181; 52/716;
52/823; 49/462; 293/128
[58] Field of Search .................. 428/31, 121, 122, 130,
428/192, 358, 125, 126, 124, 181; 52/716, 400,
823; 49/462, 490; 293/128; 24/293-295, 297

[56] References Cited

U.S. PATENT DOCUMENTS

| 1,908,863 | 5/1933 | Reid | 428/126 X |
| 1,921,484 | 8/1933 | Schlegel | 428/122 |
| 3,382,614 | 5/1968 | Adell | 52/716 |
| 4,220,681 | 9/1980 | Narita | 49/490 X |
| 4,259,812 | 4/1981 | Adell | 52/716 X |
| 4,271,633 | 6/1981 | Adell | 52/716 X |
| 4,316,348 | 2/1982 | Adell | 49/462 |
| 4,334,700 | 6/1982 | Adell | 49/462 X |
| 4,338,148 | 7/1982 | Adell | 156/216 X |

Primary Examiner—Alexander S. Thomas
Attorney, Agent, or Firm—Stephenson & Boller

[57] ABSTRACT

An ornamental and protective door edge guard comprises a metal strip of generally U-shaped cross section having inner and outer legs via which the edge guard is self-retaining on the edge of a vehicle door. An insulating layer is applied to the strip to protectively insulate the interior of the strip from the door to which it is applied. Various embodiments of edge guards are disclosed with each having on at least one of the legs thereof, an insulated bead formed by reversing the extreme distal margin of the strip and insulating layer such that the insulating layer covers both that surface portion of the underlying metal bead which faces toward, and but for the insulating layer would be in contact with, the door edge as well as that surface portion which faces away from the door edge. Some embodiments have beads formed by double reversals of the strip and insulating layer.

17 Claims, 17 Drawing Figures

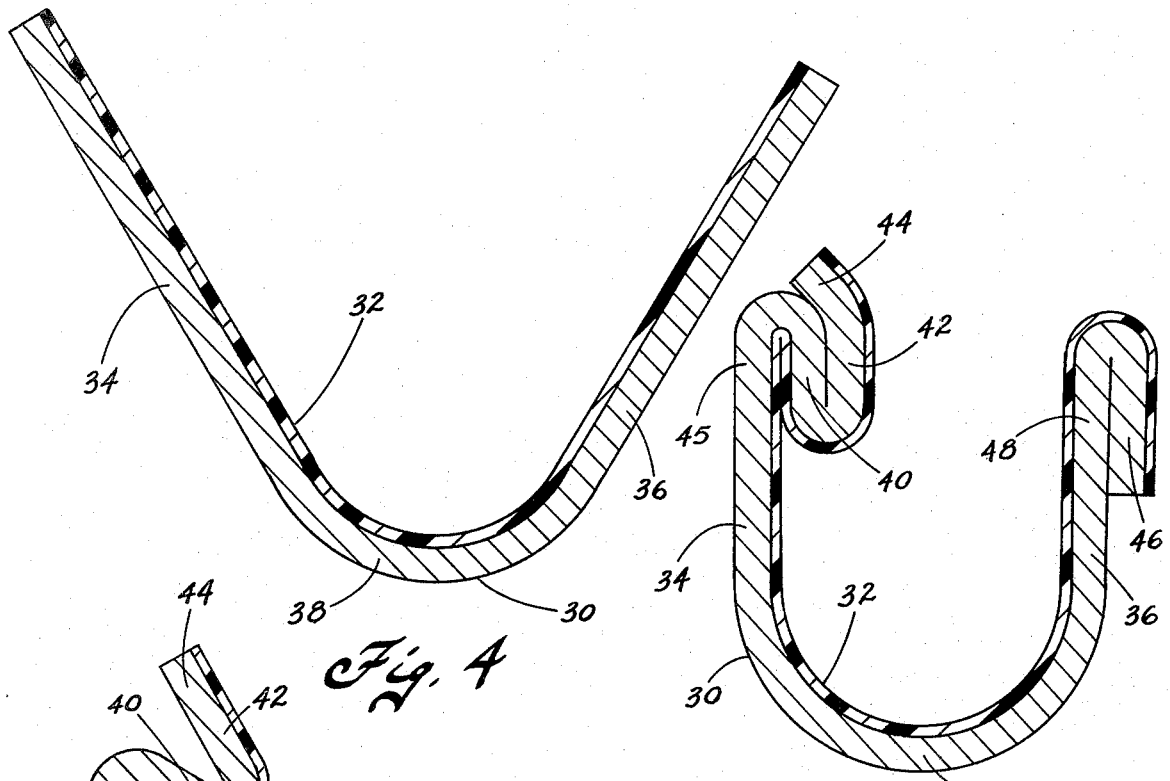
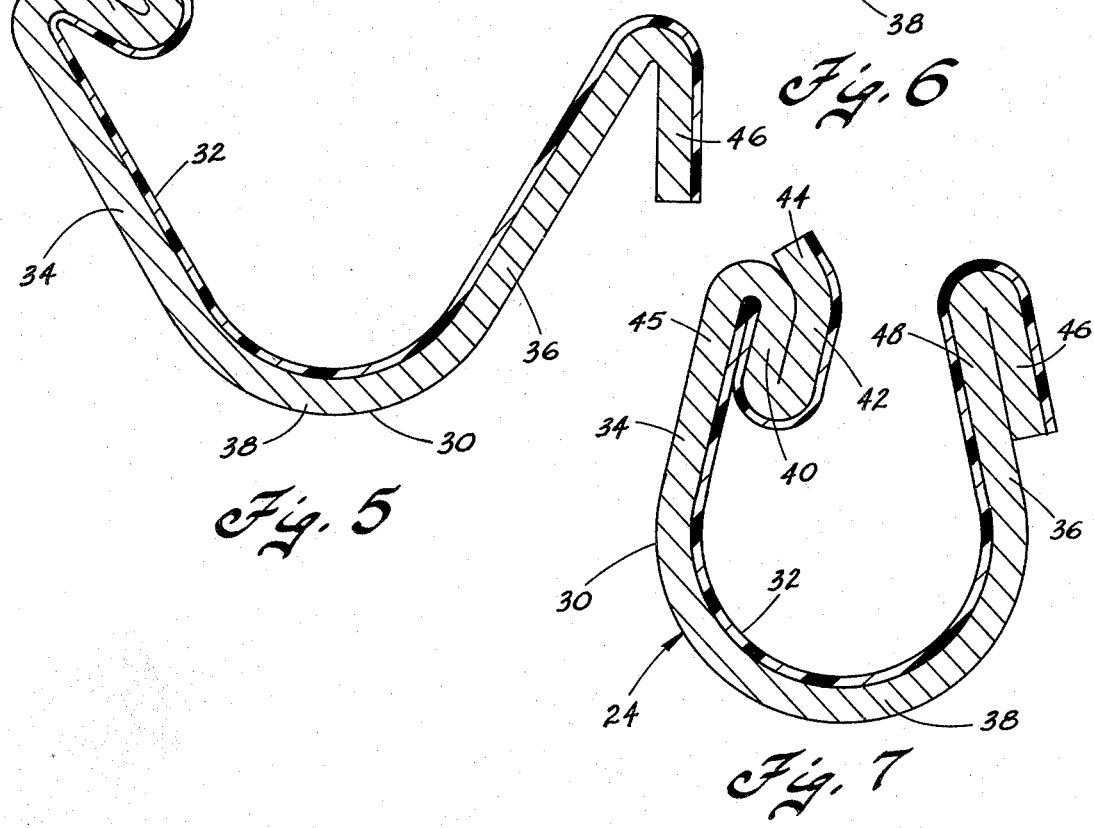

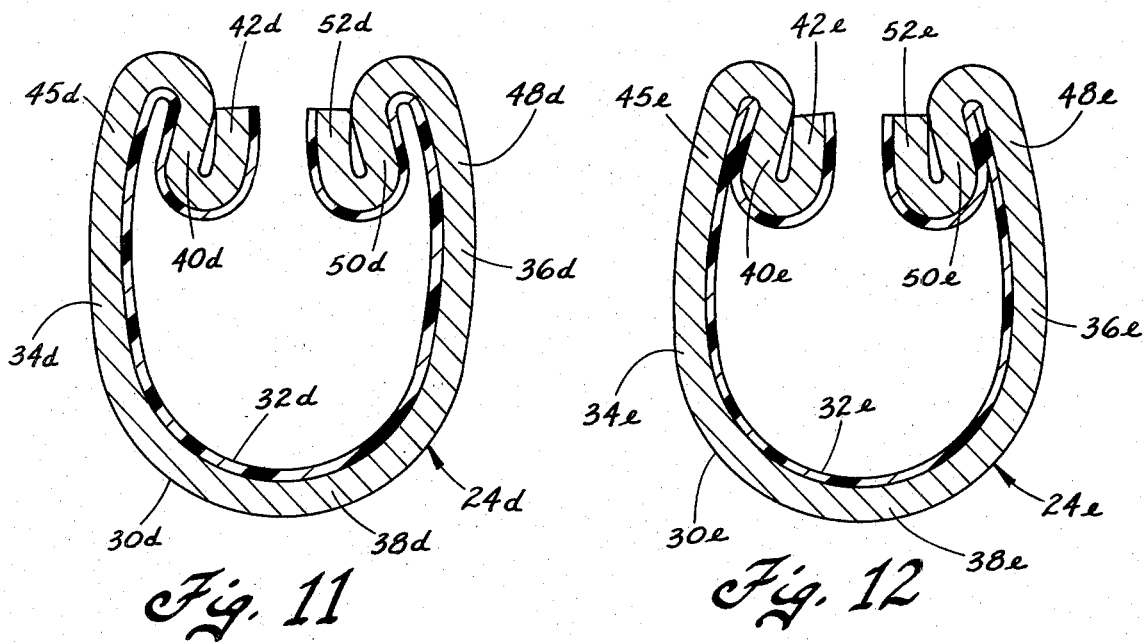
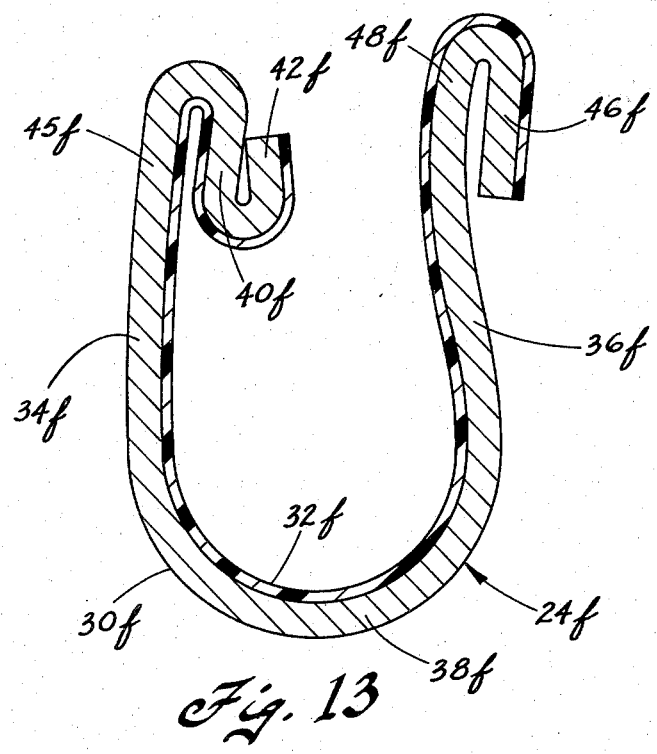

DOOR EDGE GUARD

BACKGROUND AND SUMMARY OF THE INVENTION

This invention relates to ornamental and protective edge guards which are applied to the edges of sheet metal closure panels of automotive vehicles, such as the doors of the vehicles.

In a typical automotive vehicle, door edge guards are applied to the trailing edges of the vehicle's doors to protect the door edges from damage which might be caused by striking an object which may be present in a door's path when the door is opened. It is often desirable for such door edge guards to be made of bright metal, such as stainless steel, aluminum, or bimetal, due to the excellent protective and ornamental character of such material. Furthermore, the inherent strength and resiliency of metallic edge guards enable them to be self-retaining on the doors. Correspondingly, it is generally undesirably to use separate fasteners or adhesives in securing door edge guards to doors since they involve extra cost in labor and materials. It is also generally undesirable to use non-metallic edge guards, such as vinyl edge guards, since they do not possess the excellent protective, ornamental, and self-retention characteristics of bright metallic edge guards. In connection with the usage of self-retaining edge guards, it has heretofore been recognized that the potential for paint scratching and marring exists when the metallic edge guards are applied to vehicle door edges. Such paint scratching can lead to premature corrosion of the door edge metal.

Some of applicant's own inventions have addressed the matter of possible paint scratching and have provided solutions. Applicant has also recognized that electrochemical corrosion is a potential problem where the metal of the vehicle door and the metal of the edge guard are dissimilar. Some of applicant's own inventions have addressed this problem and provided solutions. Reference is made to applicant's own U.S. Pat. No. 2,704,687 and his pending U.S. patent application Ser. No. 021,084, filed Mar. 16, 1979 now U.S. Pat. No. 4,259,812; Ser. No. 021,085, filed Mar. 16, 1979 now U.S. Pat. No. 4,271,633; Ser. No. 118,475 now U.S. Pat. No. 4,334,700, filed Feb. 4, 1980; Ser. No. 132,525, filed Mar. 21, 1980 now U.S. Pat. No. 4,316,398; and Ser. No. 194,747 now U.S. Pat. No. 4,338,148, Ser. Nos. 194,748, and 194,749, filed Oct. 7, 1980; and Ser. Nos. 205,419 and 205,420, filed Nov. 10, 1980, and Ser. No. 216,483, filed Dec. 15, 1980.

These prior applications disclose the use of plastic liners to insulate the metal edge guard from the vehicle door. The liners may be extruded plastic, plastic encapsulation, foam plastic, or plastic film by way of example.

It is usually desirable in a metallic edge guard formed from strip, or sheet, material to provide beads at the distal portions of the inner and outer legs of the edge guard. The beads eliminate the raw edges which would otherwise exist and are beneficial in improving the retention characteristics of the edge guard on the door. At least some of the aforementioned applications disclose edge guards in which the metal beads are covered by insulating material.

The present invention is directed to a new and improved edge guard and method whereby insulated beads of novel construction are provided. The invention is disclosed in a number of embodiments herein, illustrating the exceptional potential for practicing the invention. While a principal advantage of the invention is that the metallic edge guard is protectively insulated from the door edge on which it is applied, the invention in certain embodiments thereof possesses desirable aesthetic qualities, in conjunction with its functional attributes. More specifically, the invention can provide a thin decorative band along the front edge of the outer leg forming a contrast to the bright metal strip. The thin decorative band is provided by the insulating liner, which preferably is a vinyl plastic film having a dark color such as dark brown, black, or navy. The invention, in its preferred forms, nonetheless is efficient in its use of materials, requiring only the metal strip and the vinyl liner, the two being adhered together by any suitable means such as adhesive, heat bonding, etc. The invention provides the desirable characteristics of metallic edge guards without the potential disadvantages which a strictly metallic edge guard may have. Thus, the invention exhibits excellent retention characteristics, appearance characteristics, and protective characteristics while utilizing only a metal strip and insulating layer.

Additional features, advantages, and benefits, along with those ennumerated above, will be seen in the ensuing description and claims which should be considered inconjunction with the accompanying drawings. The drawings disclose presently preferred embodiments of the invention in accordance with the best mode presently contemplated for carrying out the invention.

BRIEF DESCRIPTION OF THE DRAWINGS

FIGS. 4, 5, 6, and 7 are sectional views of further steps in the method of making an edge guard embodying principles of the present invention, the finished cross sectional shape being shown in FIG. 7.

FIGS. 8 through 17 inclusive are sectional views illustrating cross sections of further embodiments of the present invention.

DESCRIPTION OF THE PREFERRED EMBODIMENTS

Figure 1:
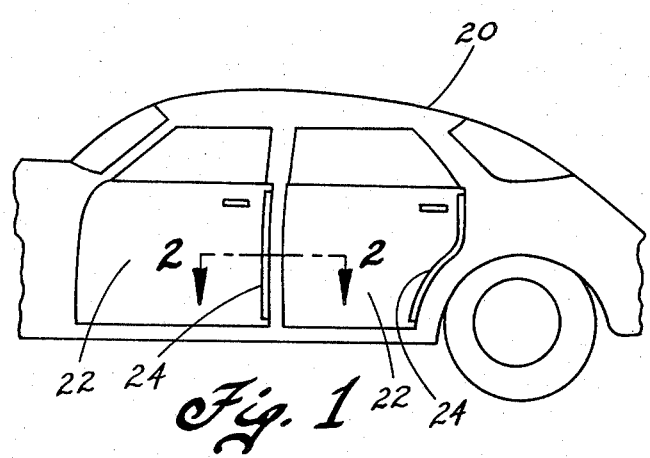
FIG. 1 is a partial side elevational view of the left side of an automobile having door edge guards embodying principles of the present invention.

FIG. 1 shows a portion of an automobile 20 comprising front and rear doors 22 on the trailing edges of which are applied door edge guards 24 embodying principles of the present invention. The edge guards are generally elongate and essentially coextensive in length with the trailing edges of the doors, each edge guard conforming to the contour of the trailing edge of its door. It will be appreciated that the actual length of an edge guard may be somewhat less than the length of the trailing door edge, and therefore that the drawing is merely exemplary. Moreover, the edge guards may incorporate a certain amount of overbend and/or may be notched at selected locations, as required in accordance with the prevailing manufacturing practice.

Figure 2:
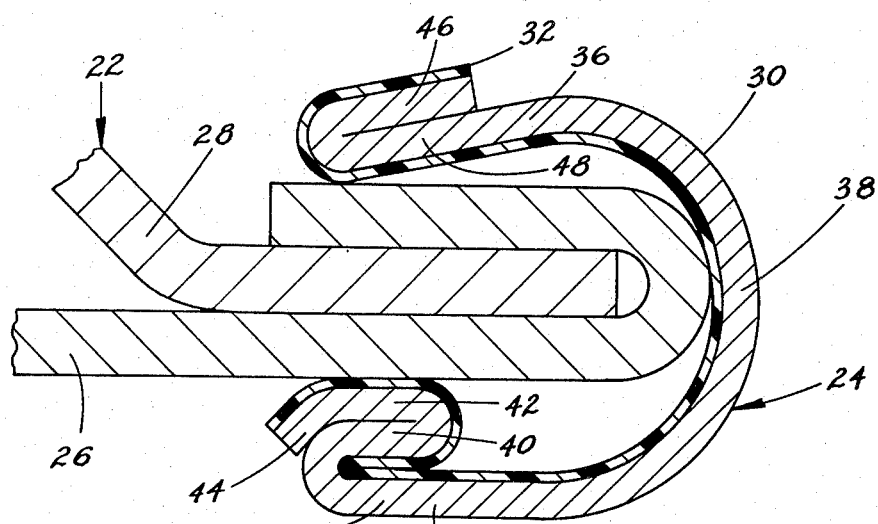
FIG. 2 is an enlarged sectional view taken in the direction of arrows 2—2 in FIG. 1.

FIG. 2 illustrates the edge guard cross section where it can be seen that each edge guard is applied over the trailing door edge. In accordance with the prevailing method and construction of automobile doors, each door 22 comprises an outer sheet metal door panel 26 and an inner sheet metal door panel 28. The trailing door edge comprises the outer panel 26 being wrapped around and suitably secured to the inner panel 28, as shown, for example by welding. The total thickness overall of the trailing edge of the door is subject to a rather substantial tolerance, and the edge guard is dimensioned to accommodate variations in door edge thickness, with the physical characteristics of the materials, particularly flexing and resiliency, allowing the suitably dimensioned edge guard to be self-retaining on a range of door edge thicknesses. The doors are typically primed and painted steel, and if chipped or scratched to the bare metal are susceptible to corrosion. The door edge guard serves to protect the door edge from such chipping, scratching, and marring when it is in use. In the case of a strictly metal edge guard, the possibility that the edge guard itself might cause paint chipping is not absolutely zero. For example if a door edge guard is hit hard enough, it can impact the door edge and damage the paint. Once the protective covering for the door steel has been penetrated, corrosion can occur. There is corrosion due to moisture, and where the edge guard metal is dissimilar to the door metal electrochemical corrosion can occur. In either case the corrosion is definitely undesirable. Thus, the present invention comprises in addition to a metal edge guard 30 of generally U-shaped cross section, an insulating layer 32 lining the interior of the U. Preferably, the metal edge guard 30 is made from one of the usual metals mentioned earlier while insulating layer 32 is made from a plastic sheet or film, such as vinyl, mylar, or polyethylene, by way of example. As can be seen in FIG. 2, insulating layer 32 prevents metal edge guard 30 from contacting door 22, and its insulating characteristics prevent electrochemical corrosion from occurring between the metal of the edge guard and that of the door if they are dissimilar. Also, depending upon the particular character of the insulating layer, it may impart a certain cushioning or impact absorbing effect whereby the full impact of blows to the edge guard is not transmitted to the door edge.

More detailed consideration of FIG. 2 discloses that metal edge guard 30 comprises an outer leg 34, an inner leg 36, and a curved bend 38 joining the proximal portions of the legs 34, 36. The distal portion of outer leg 34 is provided with sections 40, 42, and 45 while the distal portion of inner leg 36 is provided with sections 46 and 48. The sections 40, 42, and 45 define a metal bead for the outer leg while the sections 46 and 48 define a metal bead for the inner leg. Importantly, insulating layer 32 serves to insulate both beads.

Figure 3:
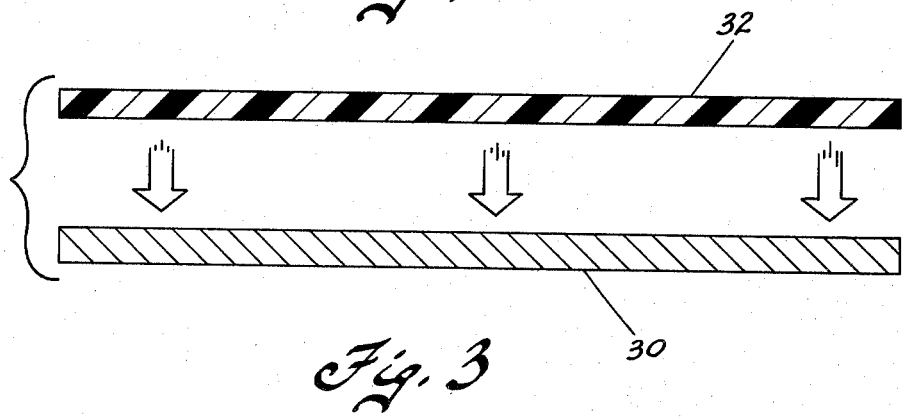
FIG. 3 is a fragmentary sectional view illustrating a step in the method of making an edge guard embodying principles of the present invention.

Turning for just a moment to FIG. 3, one will see that preparatory to forming the edge guard to the illustrated cross section, insulating layer 32 is applied to one of the major surfaces of the metal strip forming the metal edge guard 30. The insulating layer may be secured by any suitable means, such as those referred to above. It is preferable that the confronting areas of metal and insulation be in full surface contact although it should be recognized that other techniques and procedures may be employed to assemble the insulating layer to the metal. For commercial purposes, both strip 30 and insulating layer 32 may come in widths much wider than required for the individual edge guard, and therefore the two can be bonded together and the laminate then slit to the required width for the individual edge guard.

Returning now to FIG. 2, the reader will observe that between sections 40 and 45 there is a double thickness of insulating layer and that there is a single thickness of insulating layer on the surface of section 42 which faces toward, and but for the insulating layer would be in contact with, the door edge. On the inner leg there is a single thickness of insulating layer on the surface of section 48 which faces toward, and but for the insulating layer would be in contact with, the door edge. Thus, edge guard 24 embodies insulated metal beads at the distal ends of both legs separating the edge guard metal from the door edge. The bead of leg 34 comprises three metal thicknesses and three thicknesses of insulating layer while that of leg 36 comprises two thicknesses of metal and two of insulating layer. The bead of leg 34 is formed by doubly reversing the extreme distal margin of the metal strip and insulating layer such that at one reversal (sections 40, 42) there is metal-to-metal confrontation and at the other reversal (sections 40, 45) there is insulating layer-to-insulating layer confrontation. The bead of leg 36 is formed by a single reversal of the extreme distal margin of the strip and insulating layer, and the insulating layer covers that surface of section 46 which faces away from the door edge. The confronting sections 46, 48 are in metal-to-metal contact as are the sections 40, 42. The two thicknesses of insulating layer between sections 40, 45 are in contact with each other. The bead of leg 34 is shown to have a further section 44 turned slightly outwardly so that when the edge guard 24 is installed on a door edge a contour covered with insulation is thereby presented; such is not required for the opposite bead because the end is well rounded by the single reversal of the strip and insulating layer. Section 45 is generally coplanar, or in line, with leg 34 and hence the bead of leg 34 will be recognized as being disposed toward the interior of the U relative to leg 34. By analogy the bead of the opposite leg will be recognized as being disposed toward the exterior of the U relative to leg 36.

The disclosed edge guard 24 possesses the attributes of strictly metallic edge guards without many of their disadvantages. The metal beads improve the structural characteristics of the edge guard, particularly the self-retention. The U-shaped cross section allows flexing upon mounting to a door edge. The insulating layer provides a full lining of the interior of the U along with insulation of the beaded ends of the legs. Hence, there is a minimum risk of paint scratching or marring upon assembly to a door edge, and in use there is a reduced liklihood or incidence of corrosive action occurring, absent of course conditions of extreme abuse. Hence, in normal use the edge guard of the present invention should provide improved performance and appearance over the life of the vehicle.

FIGS. 4 through 7 inclusive illustrate steps in the method of making the edge guard 24. The final cross sectional shape is shown in FIG. 7, and from comparison with FIG. 2 it can be seen how the edge guard flexes upon installation to become self-retaining on the door edge. The edge guard is formed by conventional techniques, being formed to the desired cross section by roll forming. Once the cross section has been formed, the edge guard is cut to length and contoured to fit the contour of the trailing edge of the door to which it is to be applied. Depending upon the door contour, additional ancillary operations may be useful, such as selective overbending and/or notching. In view of the preceding textual description, it is believed that the drawings of FIGS. 4 through 7 do not require further detailed discussion. It should be noted that the actual sequence of operations in forming an edge guard is merely exemplary, and that the scope of the invention should not be limited by the specific sequence disclosed. Also it should be pointed out that while the drawings disclose approximately representative proportions, there should be no inference created thereby that the drawings disclose exact scales or proportions, and the scope of the invention should likewise not be limited by the representative showings.

From an appearance standpoint, the edge guard of FIG. 2 when installed as shown presents a bright metal appearance enhancing the elegance of the vehicle in addition to the functional enhancements already mentioned. If the edge guard were appropriately contoured and if the inner and outer legs were reversed, then the edge guard would present a somewhat different appearance. More specifically the appearance presented in that case would be of a bright metal containing a narrow band of insulating layer running lengthwise of the edge guard along its forward outboard, or leading outboard, edge of the outer leg. In other words the insulating layer covering section 46 would now be in view to an observer viewing the FIG. 1 installation. By making the insulating layer a dark vinyl, such as dark brown, black, or navy, (which will not discolor with age), an esthetically pleasing highlight is added in conjunction with the functional attributes of the insulated edge guard.

Figure 8:
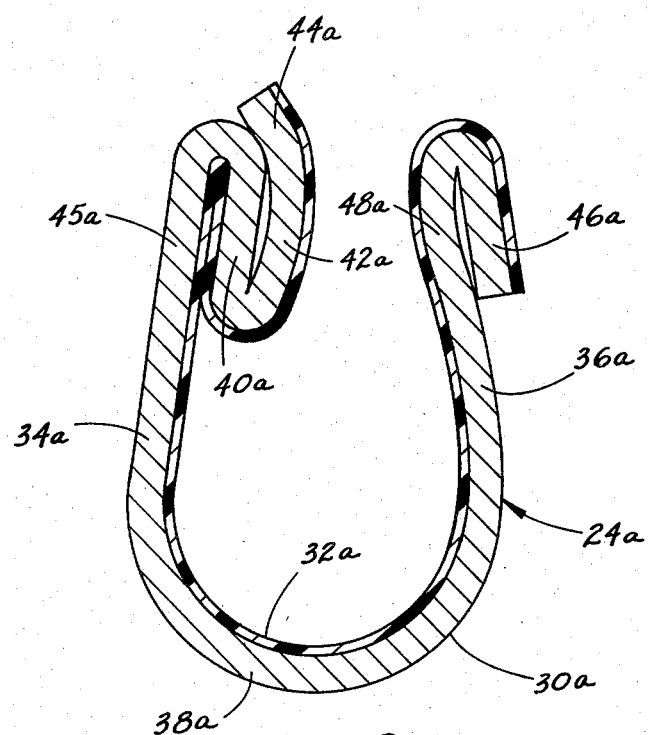

FIG. 8 illustrates another embodiment of edge guard 24a embodying the present invention. Corresponding components in FIGS. 8 through 17 are referenced to their counterparts of the first embodiment 24 by the same base reference numeral, however in each successive embodiment each base reference numeral is followed by its own literal suffix corresponding to that embodiment. Hence in the FIG. 8 embodiment all reference numerals are followed by the suffix a, and so on for the remaining embodiments. The FIG. 8 embodiment differs from the first embodiment in that the legs 34a, 36a are somewhat longer as are the sections 40a, 42a, 45a, 46a, and 48a. Also section 42a and section 48a are slightly bowed.

Figures 9, 10:
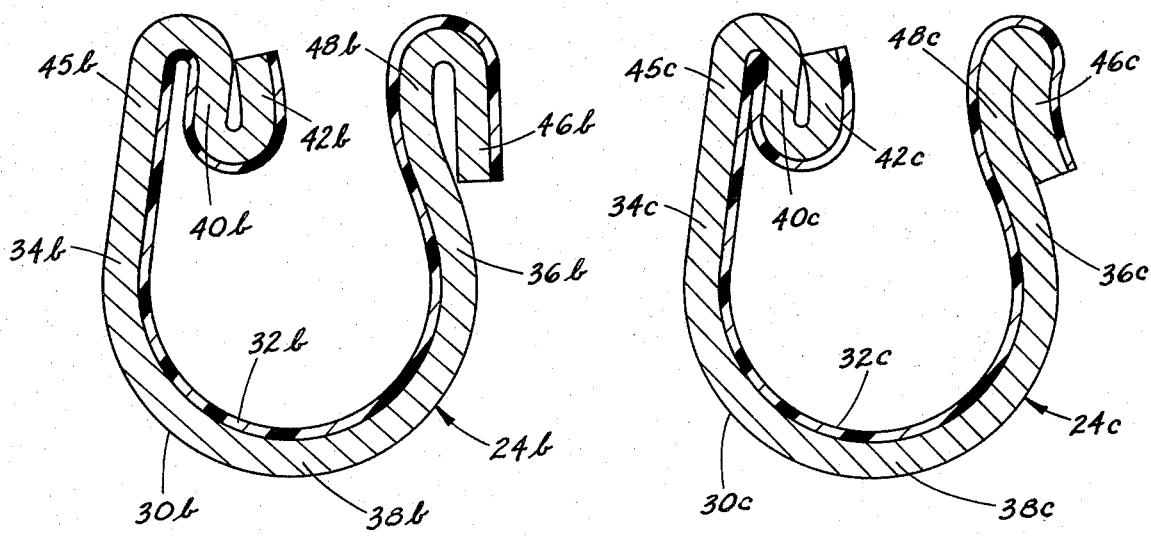

The FIG. 9 embodiment 24b is overall generally of the approximate same proportions as the first embodiment. Sections 42b and 48b are slightly bowed. The bowing of section 42b permits the elimination of section corresponding to section 44 of the first embodiment. Also it will be observed that there is a small gap between the two thicknesses of insulating layer lying between the sections 40b and 45b.

The FIG. 10 embodiment 24c is very similar to the FIG. 9 embodiment 24b, the differences being that the gap between the two thicknesses of insulating layer lying between the sections 40c and 45c has been eliminated, and the section 46c is bowed to conform with the section 48c.

The FIG. 11 embodiment 24d differs more in appearance from the first embodiment than did the second and third embodiments. First, the legs 34d, 36d are slightly bowed. Second, the bead on leg 36d is disposed toward the interior of the U and is essentially the mirror image of the bead on leg 34d.

The FIG. 12 embodiment 24e is virtually identical to the FIG. 11 embodiment 24d except that in FIG. 12 there is no gap between the double thicknesses of insulating layer between sections 40e and 45e of the one bead and between sections 48e and 50e of the other bead. In both FIGS. 11 and 12 the bead on the right hand leg 36d, 36e has been identified by new reference numeral designations for the sections 50d, 50e, and 52d, 52e since they do not have exact counterparts in the earlier embodiments due to the fact that in the FIGS. 11 and 12 embodiments the beads on the right hand legs are disposed toward the interior of the U.

The FIG. 13 embodiment 24f is somewhat like the FIG. 8 embodiment 24a in overall proportions. However, there is no section corresponding to section 44 and section 42f is shorter than its FIG. 8 counterpart. Leg 36f exhibits a slightly different bowing and there is a gap between the sections 46f, 48f of the leg 36f bead.

Figure 14:
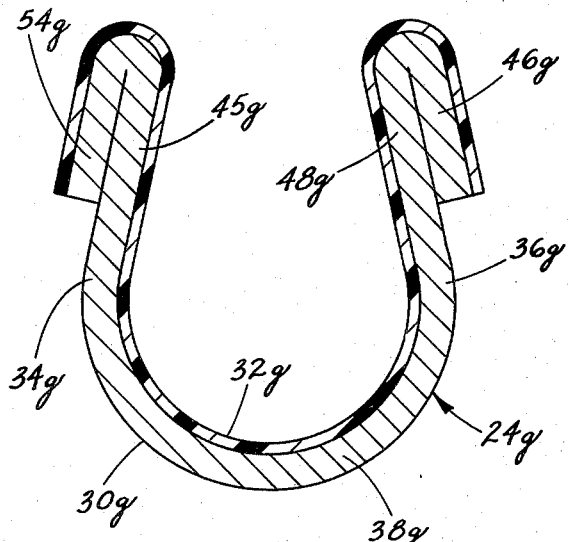

The right hand leg 36g of the FIG. 14 embodiment and its bead are virtually identical to their counterparts of the first embodiment 24. The left hand leg 34g and its bead are essentially the mirror image of the right hand leg and its bead. Since the section 54g has no exact counterpart in the earlier embodiments it has been given a new base numeral.

Figure 15:
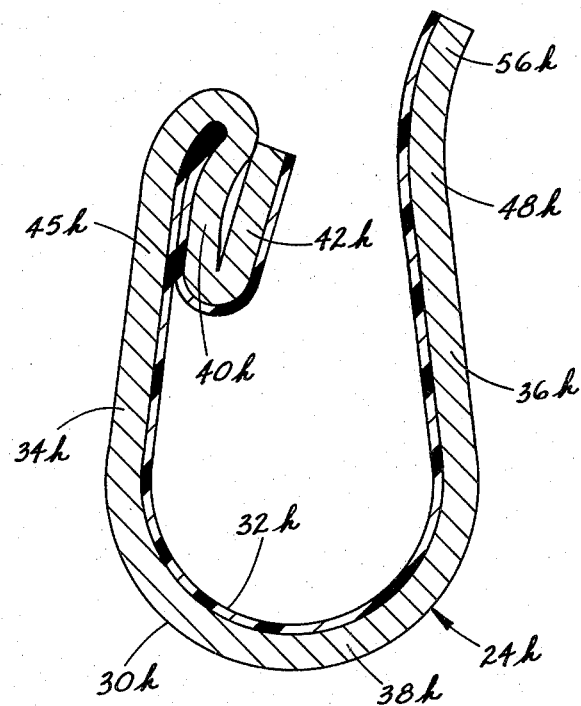

FIG. 15 discloses still another embodiment 24h. Sections 40h, 45h are bowed as shown while section 42h is generally straight. The right hand leg 36h is unbeaded and instead has a curved extension 56h.

Figure 16:
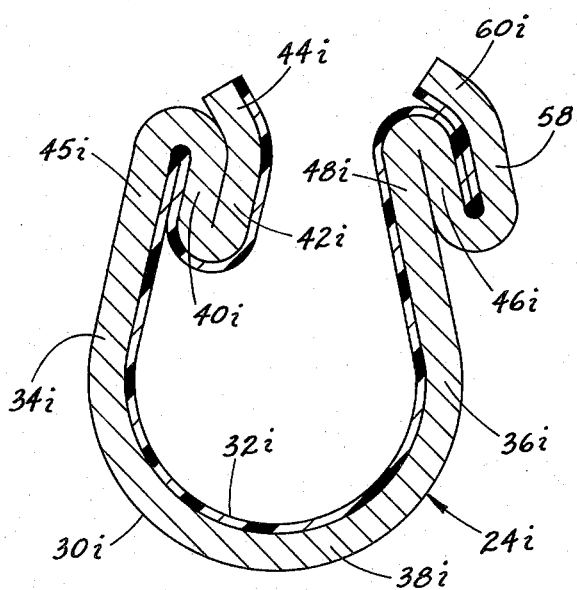

The left hand leg 34i of the FIG. 16 embodiment 24i is identical to the left hand leg 34 of the first embodiment 24. The bead of the right hand leg 36i is identical to the bead of the left hand leg 34i, but it is not its mirror image. The new designations 58i, 60i do not have exact counterparts in the earlier embodiments.

Figure 17:
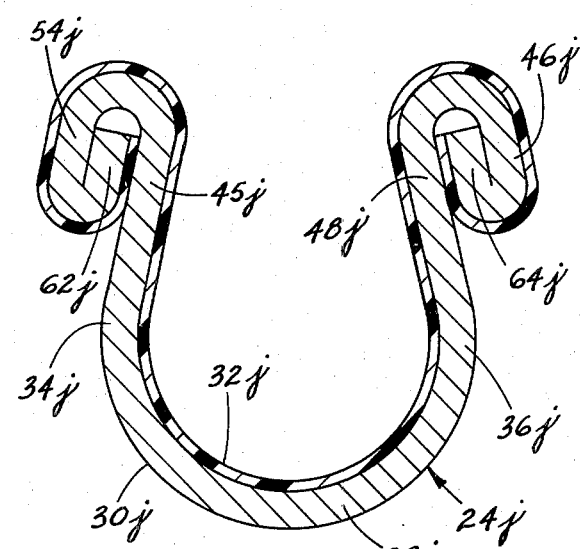

The FIG. 17 embodiment 24j is perhaps most like the FIG. 14 embodiment 24g. In FIG. 17, the legs and beads are mirror images. Each bead is formed by a double reversal, but the sense of the double reversals of each bead of FIG. 17 differs from that of the previous embodiments in that the raw edges of the metal are tucked inwardly of the beads in FIG. 17. Hence, the new reference designations 62j and 64j.

In view of the extensive consideration accorded to the first embodiment 24, it is believed unnecessary to further discuss the subsequent embodiments in greater detail. The drawing figures adequately disclose the generic aspects of the invention as called for in the generic claims appended hereto. It should be apparent which of the subsequent embodiments disclose the decorative band provided by the insulating material. While preferred embodiments have been disclosed and described, one will appreciate that the invention is capable of being practiced in a large number of specific embodiments. Indeed, the variety disclosed herein demonstrates this potential. However, common to all embodiments are important functional and esthetic attributes of an ornamental and protective edge guard providing improved insulation and appearance capabilities.

What is claimed as the invention is:

1. An insulated metal, protective and ornamental edge guard of generally U-shaped cross section comprising inner and outer legs via which the edge guard is self-retaining on the edge of a sheet metal panel of a vehicle body when the edge guard is installed thereon comprising:
- a metal strip having a generally U-shaped cross section with the sides of the U corresponding to the legs of the edge guard;
- an insulating layer adhered to and covering the interior of the U of the metal strip;
- and an insulated metal bead at the distal portion of one leg formed by the insulating layer overlying and being adhered in surface-to-surface contact with the strip at the extreme distal margin of the strip forming that side of the U corresponding to said one leg and by both said extreme distal margin of the strip and the portion of the insulating layer overlying and adhered thereto being doubly reversed such that at one reversal there is metal-to-metal confrontation and at the other reversal there is insulating layer-to-insulating layer confrontation and the insulating layer covers that surface portion of the underlying metal bead which faces toward, and but for the insulating layer would be in contact with, the sheet metal panel when the edge guard is installed thereon.

2. An edge guard as called for in claim 1 wherein at said metal-to-metal confrontation there is metal-to-metal contact.

3. An edge guard as called for in claim 1 wherein at said insulating layer-to-insulating layer confrontation there is insulating layer-to-insulating layer contact.

4. An edge guard as called for in claim 1 wherein the double reversal is disposed toward the interior of the U.

5. An edge guard as defined in claim 1 wherein the double reversal is disposed toward the exterior of the U.

6. In an ornamental and protective edge guard of generally U-shaped cross section comprising inner and outer legs via which the edge guard is self-retaining on the edge of a sheet metal panel of a vehicle body when the edge guard is installed thereon, the edge guard comprising a metal strip of generally U-shaped cross section with the sides of the U corresponding to the legs of the edge guard and an insulating layer secured to the interior surface of the metal strip, the improvement comprising a bead at the distal portion of one leg and comprising a single double reversal fold of three thicknesses of the metal strip and of three thicknesses of an insulating layer disposed such that a thickness of said insulating layer is on the exterior of the bead toward the interior of the U-shaped cross section.

7. The improvement called for in claim 6 wherein the three thicknesses of the metal strip and the three thicknesses of insulating layer are disposed as a single thickness of metal, a double thickness of insulating layer, a double thickness of metal, and a single thickness of insulating layer.

8. The improvement called for in claim 7 including at the distal portion of the other leg a bead also comprising three thicknesses of the metal strip and three thicknesses of an insulating layer and also arranged as a single thickness of metal, a double thickness of insulating layer, a double thickness of metal, and a single thickness of insulating layer.

9. The improvement called for in claim 8 wherein the bead of said other leg has the thicknesses of its metal and insulating layer disposed as the mirror image of the thicknesses of the metal and insulating layer forming the bead of said one leg.

10. The improvement called for in claim 6 wherein the three thicknesses of the metal strip and the three thicknesses of the insulating layer are disposed as a single thickness of insulating layer, a single thickness of metal, a single thickness of insulating layer, a double thickness of metal, and a single thickness of insulating layer.

11. The improvement called for in claim 6 wherein two of the three thicknesses of insulating layer are disposed such that the remaining thickness of insulating layer and all three thicknesses of the metal strip are disposed between them.

12. The improvement called for in claim 6 wherein one of the three thicknesses of insulating layer and one of the three thicknesses of the metal strip are disposed such that the remaining two thicknesses of insulating layer and the remaining two thicknesses of the metal strip are disposed between them.

13. The improvement called for in claim 6 wherein one thickness of said three thicknesses of said metal strip is generally in line with that portion of the strip forming the side of the U corresponding to said one leg and the the remaining two thicknesses of said three thicknesses of said metal strip and all three said thicknesses of insulating layer are disposed toward the interior of the U relative to said one thickness of said metal strip.

14. The improvement called for in claim 6 wherein one thickness of said three thicknesses of said metal strip is generally in line with that portion of the strip forming the side of the U corresponding to said one leg and one thickness of said three thicknesses of insulating layer is disposed toward the interior of the U relative to said one thickness of said metal strip and the remaining two thicknesses of said three thicknesses of said metal strip and the remaining two thicknesses of said three thicknesses of insulating layer are disposed toward the exterior of the U relative to said one thickness of said three thicknesses of said metal strip.

15. The improvement called for in claim 6 wherein the other leg has a bead at the distal portion thereof which comprises a double thickness of the metal of said strip and two thicknesses of insulating layer.

16. The improvement called for in claim 15 wherein the bead of said other leg has one of said two thicknesses of insulating layer disposed toward the interior of the U relative to said double thickness of metal and has the other of said two thicknesses of insulating layer disposed toward the exterior of the U relative to said double thickness of metal.

17. The improvement called for in claim 6 wherein two thicknesses of said three thicknesses of said metal strip are in metal-to-metal contact and two thicknesses of said three thicknesses of insulating layer are in insulating layer-to-insulating layer contact.

* * * * *